UNITED STATES PATENT OFFICE.

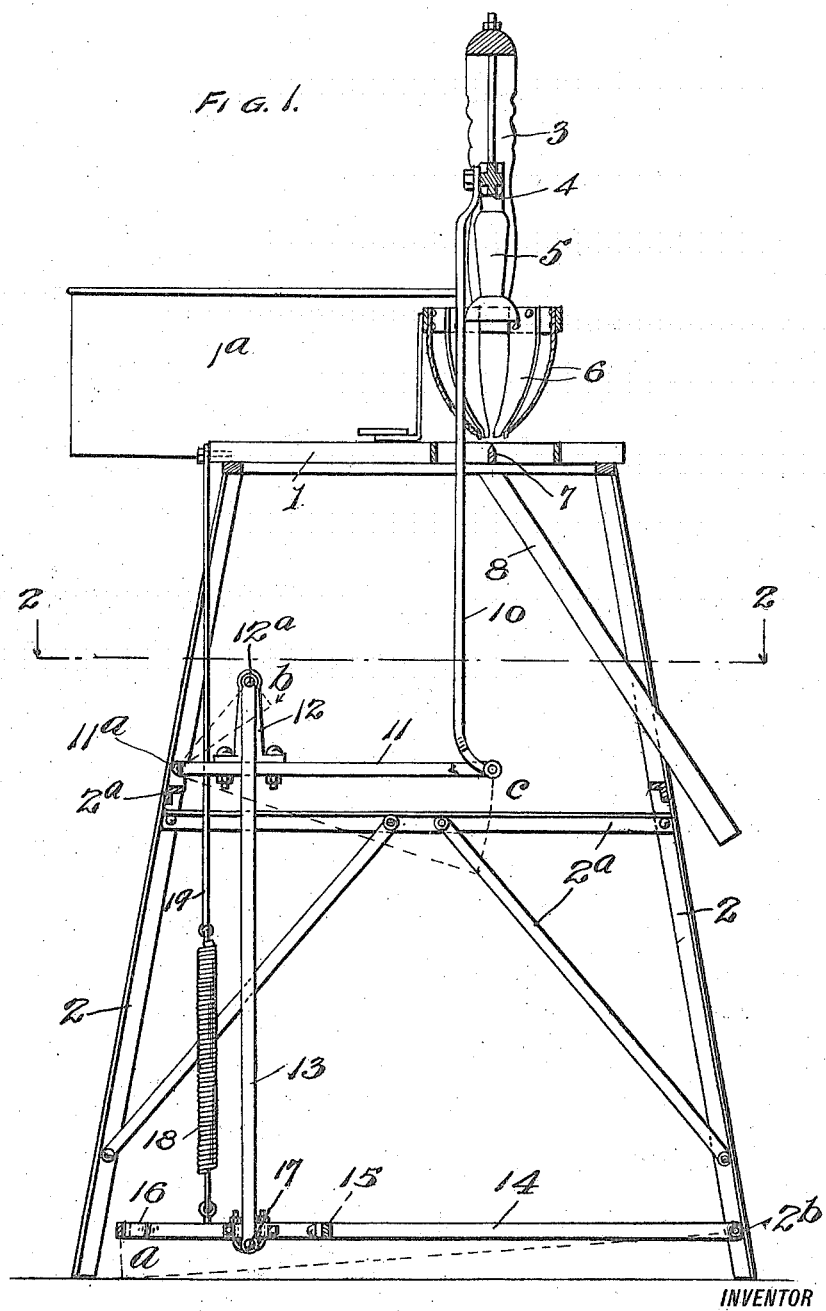

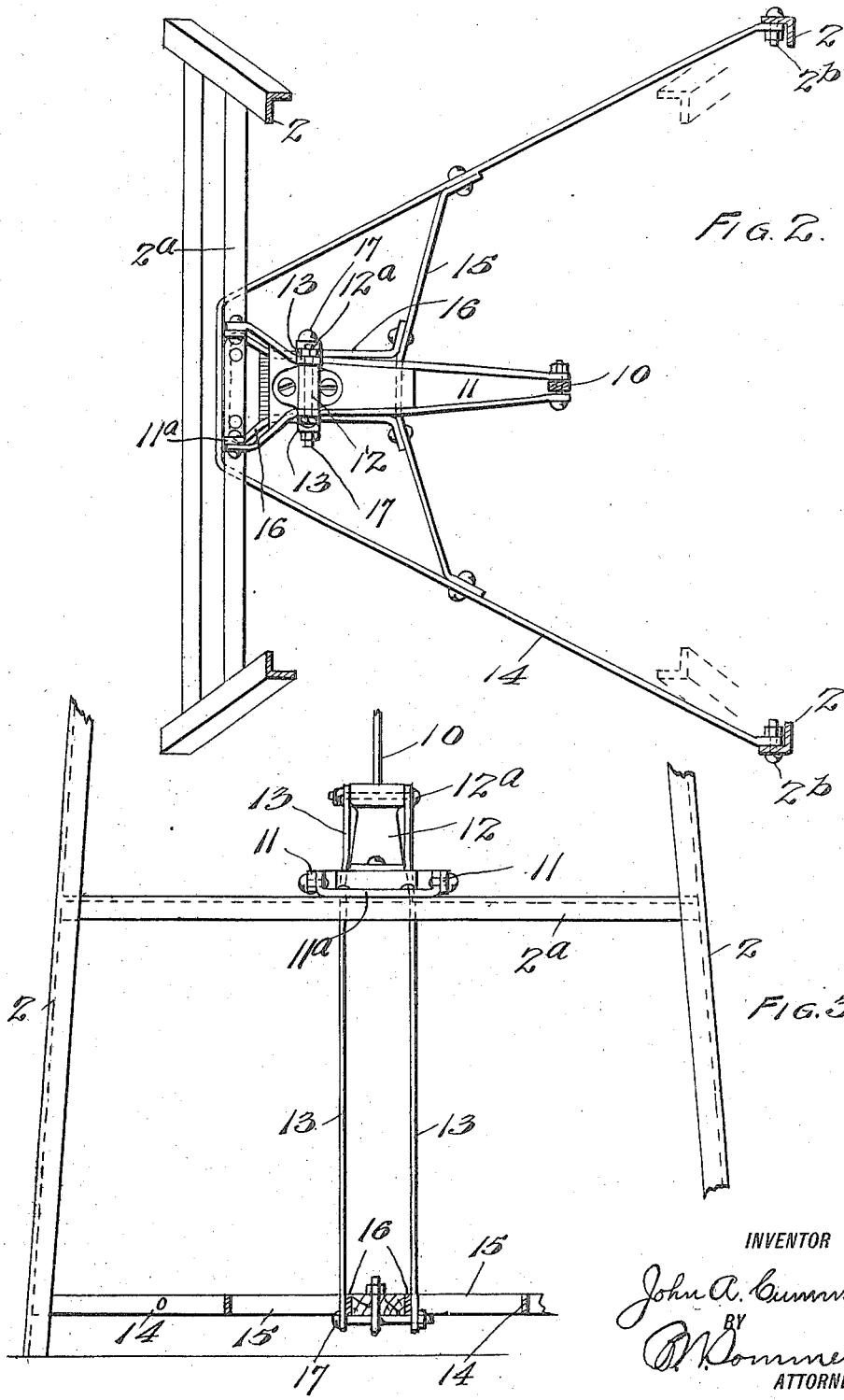

JOHN A. CUMMINGS, OF BANGOR, MAINE, ASSIGNOR TO LIGHTNING SEED CUTTER COMPANY, OF BANGOR, MAINE.

TREADLE MECHANISM.

1,263,649.	Specification of Letters Patent.	Patented Apr. 23, 1918.

Application filed June 30, 1917. Serial No. 177,868.

*To all whom it may concern:*

Be it known that I, JOHN A. CUMMINGS, a citizen of the United States, residing at Bangor, county of Penobscot, State of Maine, have invented certain new and useful Improvements in Treadle Mechanism, of which the following is a specification.

This invention relates to improvements in treadle mechanism particularly adapted for use in machines having plungers or cutters carried by a vertically reciprocating cross head actuated from a foot treadle as in potato cutters and like machines.

The object of the invention is to provide means for increasing the leverage on the actuating lever which is connected with the cross head, while obtaining a maximum length of reciprocating movement of the latter consistent with a practicable foot movement of the treadle connected with the actuating lever. The invention consists in the particular construction, arrangement and combination of the parts as hereinafter described and claimed.

In the accompanying drawings which are designed to illustrate the inventive idea and not as defining the scope or limits of the invention—

Figure 1 is a vertical section of a potato cutter having my improved treadle mechanism applied thereto;

Fig. 2 is a horizontal section on the line 2—2 of Fig. 1, and

Fig. 3 is a detail front view.

The potato cutting mechanism here shown for the purpose of illustration, is substantially the same as that shown in my United States patent dated December 1, 1914, Number 1,189,923, and comprises a table 1, mounted on suitable legs 2 preferably made of angle iron and connected together by cross braces 2ª.

Mounted on and extending above the table is a suitable plunger frame 3 in which is slidably mounted a cross head 4, carrying a plunger 5. The plunger is arranged to work in a hopper 6 mounted on the table, said hopper being preferably formed of spring fingers arranged to guide the potatoes centrally onto cutters 7, mounted in an opening formed in the table 1.

The potatoes contained in bins 1ª are supplied by hand to the hoppers. The plungers are passed through the hoppers and force the potatoes onto the cutters, the cut pieces of potatoes dropping into a chute 8. While only one plunger and hopper is shown in the drawing a machine of this character preferably has two plungers mounted on the cross head and two sets of hoppers and cutters.

The mechanism for actuating the cross head and plungers, comprises a rod 10 passing freely through the table 1 and having its upper end connected to the cross head 4. The lower end of the rod 10 is pivotally connected to the free end of a lever 11. The other end of this lever is pivoted on a bracket 11ª centrally mounted on the horizontal brace rod 2ª which is connected to the two front legs of the table about midway between the table top and the lower ends of the legs.

A short arm 12 is fixed on the lever 11 at a point near the pivot of the latter, for example at a point about one fourth the distance between the pivot and the free end of the lever, the axis of the arm extending upward at right angles to the axis of the lever. Two links 13 are pivotally connected at their upper ends by means of a bolt 12ª to the upper end of the arm 12, the lower ends of said links being pivotally connected to a treadle 14 near the free end of the latter. The treadle is preferably in the form of a yoke, the side bars of which are pivotally mounted on bolts 2ᵇ in the rear legs near the lower ends thereof and extend forward to the central front part of the machine. A cross brace 15 connects the two side bars of the treadle and between the brace and front of the treadle is fixed a foot piece 16 to which the lower ends of the links 13 are connected on opposite sides thereof by a bolt 17.

A retracting spring 18 is connected to the foot piece 16 and has an extension rod 19 by which it is connected to the table.

By the above described actuating mechanism, the usual excess movement of the foot treadle is overcome as the distance moved by the latter is only equal to about one third the distance moved by the cross head.

When the parts are in the position shown in Fig. 1 a downward movement of the treadle through the arc *a* pulls the links 13 and arm 14 downward. The upper ends of the links and arm in their downward movement swing backward in the arc *b* away from a vertical line passing through the pivot point of the lever, so that the leverage of the links 13 on the lever 11 constantly increases and is greatest when the plungers reach the cutters.

As the point of connection of the links 13 with the lever 11 is nearer to the pivot point of the lever than to the free end of the latter, said free end, and with it the connecting rod 10 and cross head 4, will move during said downward movement of the arm 12, the distance $c$, which distance is about three times as great as the distance moved by the free end of the treadle.

I claim—

1. A treadle mechanism comprising a pivoted lever, an operating member therefor, and means including an arm fixed on and projecting at an angle to the lever connecting the latter and operating member whereby the effective lever arm is increased during the normal power applying movement of the latter.

2. A treadle mechanism comprising a pivoted lever, a pivoted operating member therefor, a link connected at one end with the operating member, and means including a member fixed on and projecting at an angle to the lever connecting the other end of the link with the lever whereby the latter end of the link is shifted during the normal power applying movement of the lever away from the pivot point of the lever.

3. A treadle mechanism comprising a lever and an operating member pivoted at opposite ends, a link connected at one end to the operating member adjacent the free end of the latter, and means including a solid member fixed on and projecting at an angle to the lever connecting the latter and link, whereby the link is shifted during the normal power applying movement away from the pivot point of the lever.

4. A treadle mechanism comprising a lever and a treadle pivoted at opposite ends, an arm on the lever projecting at right angles thereto adjacent the pivoted end thereof, and a link pivotally connected at one end to the outer end of said arm and pivotally connected at its other end to the treadle adjacent the free end of the latter.

5. A treadle mechanism comprising a lever and a treadle pivoted at opposite ends, an arm fixed on and projecting upwardly at right angles to the lever from a point nearer to the pivoted end than to the free end of said lever, and a link pivotally connected at its upper end to the upper end of said arm and pivotally connected at its lower end to the treadle adjacent the free end of the latter.

6. A treadle mechanism comprising a lever and an operating member pivoted at opposite ends, an arm fixed on and projecting at an angle to said lever between the ends thereof, and a link pivotally connected to the operating member and to a fixed pivot on said arm.

7. The combination with a vertically reciprocable head, a connecting rod, and a lever pivoted at one end and connected to the rod at its other end, of an arm on the lever projecting upwardly at right angles thereto adjacent the pivoted end thereof, a pivoted treadle, and a link pivotally connected at one end to the upper end of said arm and pivotally connected at its other end adjacent the free end of the treadle.

In testimony that I claim the foregoing as my invention, I have signed my name.

JOHN A. CUMMINGS.

Copies of this patent may be obtained for five cents each, by addressing the "Commissioner of Patents, Washington, D. C."